(12) United States Patent
Klassen et al.

(10) Patent No.: US 11,143,256 B2
(45) Date of Patent: Oct. 12, 2021

(54) MAGNETICALLY ACTUATED BRAKE

(71) Applicant: GENESIS ROBOTICS AND MOTION TECHNOLOGIES CANADA, ULC, Langley (CA)

(72) Inventors: James Brent Klassen, Surrey (CA); Damian Spasov, Port Moody (CA); Christopher Esterer, Burnaby (CA)

(73) Assignee: GENESIS ROBOTICS AND MOTION TECHNOLOGIES CANADA, ULC, Langley (CA)

( * ) Notice: Subject to any disclaimer, the term of this patent is extended or adjusted under 35 U.S.C. 154(b) by 99 days.

(21) Appl. No.: 16/617,502

(22) PCT Filed: May 31, 2018

(86) PCT No.: PCT/CA2018/050651
§ 371 (c)(1),
(2) Date: Nov. 27, 2019

(87) PCT Pub. No.: WO2018/218367
PCT Pub. Date: Dec. 6, 2018

(65) Prior Publication Data
US 2020/0109754 A1  Apr. 9, 2020

Related U.S. Application Data

(60) Provisional application No. 62/599,685, filed on Dec. 15, 2017, provisional application No. 62/514,003, filed on Jun. 1, 2017.

(51) Int. Cl.
*F16D 67/06* (2006.01)
*F16D 51/02* (2006.01)
(Continued)

(52) U.S. Cl.
CPC ............. *F16D 67/06* (2013.01); *F16D 51/02* (2013.01); *F16D 63/002* (2013.01);
(Continued)

(58) Field of Classification Search
CPC ........ F04D 27/006; F04D 25/06; F04D 13/73; F16H 57/0416; B60K 11/06;
(Continued)

(56) References Cited

U.S. PATENT DOCUMENTS 3,176,809 A * 4/1965 Monroe .................. F16D 67/06
192/12 R
3,277,357 A 10/1966 Willis
(Continued)

FOREIGN PATENT DOCUMENTS

CN  102832739 A  12/2012
DE  10229333 A1  1/2004
(Continued)

OTHER PUBLICATIONS

International Search Report and Written Opinion received for PCT application No. PCT/CA2018/050651, dated Aug. 31, 2018, 7 pages.
(Continued)

*Primary Examiner* — Tinh Dang (57) ABSTRACT

A magnetic brake for a motor uses the magnetic force on the surface of a flux concentrating rotor to pull a flexible brake spring or friction sheet into friction contact with the rotor. An electromagnetic stator pulls the flexible brake spring or friction sheet away from the rotor when it is energized. The brake spring may be a variable thickness around the circumference in a radial flux motor or radially in an axial flux motor and is thicker near where it is fixed to the housing. The brake spring may be split so it can clamp down on the rotor symmetrically. The OD of the brake spring may be
(Continued)

closer to the surrounding stator near the fixed section of the brake spring so the air gap to the brake stator is smaller and the gap to the rotor and the ID of the brake spring is larger to allow the brake stator to pull on this area with greater force initially when it is energized to disengage the brake.

22 Claims, 10 Drawing Sheets

(51) Int. Cl.
  *F16D 63/00* (2006.01)
  *F16D 65/18* (2006.01)
  *F16D 55/00* (2006.01)
  *F16D 121/14* (2012.01)
  *F16D 121/22* (2012.01)

(52) U.S. Cl.
  CPC .... *F16D 65/186* (2013.01); *F16D 2055/0058* (2013.01); *F16D 2121/14* (2013.01); *F16D 2121/22* (2013.01)

(58) Field of Classification Search
  CPC . B60K 2001/003; F16D 65/847; F16D 67/06; F16D 51/02; F16D 63/002; F16D 65/186; F16D 2055/0058; F16D 2121/22; F16D 36/00; F16D 65/14; F16D 55/00; F16F 7/08
  See application file for complete search history.

(56) References Cited

U.S. PATENT DOCUMENTS

| | | | |
|---|---|---|---|
| 3,548,985 A | | 12/1970 | Espenschied et al. |
| 3,734,245 A | * | 5/1973 | Hubbard ............... F16D 55/00 188/163 |
| 5,250,921 A | * | 10/1993 | Van Laningham ... F16D 27/112 335/296 |
| 5,490,583 A | | 2/1996 | Anderson |
| 6,594,111 B1 | | 7/2003 | Oveyssi et al. |
| 7,173,357 B2 | | 2/2007 | Naito et al. |
| 9,755,463 B2 | | 9/2017 | Klassen et al. |
| 2002/0140312 A1 | | 10/2002 | Ikeda et al. |
| 2004/0084989 A1 | | 5/2004 | Schunk et al. |
| 2011/0037335 A1 | | 2/2011 | Jang et al. |
| 2013/0186726 A1 | | 7/2013 | Collins |
| 2014/0042851 A1 | | 2/2014 | Takemoto et al. |
| 2015/0244214 A1 | | 8/2015 | Kreidler et al. |
| 2016/0164351 A1 | | 6/2016 | Weiske |

FOREIGN PATENT DOCUMENTS

| | | |
|---|---|---|
| DE | 102015213908 A1 | 1/2017 |
| EP | 0145837 A2 | 6/1985 |
| JP | 2006-353054 A | 12/2006 |
| JP | 2009103212 A | 5/2009 |
| WO | 2005/095819 A1 | 10/2005 |
| WO | 2017/015464 A1 | 1/2017 |
| WO | 2018/218366 A1 | 12/2018 |
| WO | 2018/218367 A1 | 12/2018 |

OTHER PUBLICATIONS

International Search Report and Written Opinion received for PCT application No. PCT/CA2018/050649, dated Sep. 13, 2018, 8 pages.
Non-Final Rejection received for U.S. Appl. No. 16/618,107, dated Apr. 28, 2021. 10 Pages.
European Extended Search Report received for EP Application No. 18809222.5, dated Oct. 13, 2020, 8 Pages.
Notification of Reasons for Refusal received for JP application No. 2020-515793, dated Dec. 7, 2020, 10 pages. (6 pages of English translation and 4 pages of official copy).
Notification of Reasons for Refusal received for KR application No. 10-2019-7036434, dated Nov. 25, 2020, 14 pages. (7 pages of English translation and 7 pages of official copy).
Extended European Search Report received for EP Application No. 18808727.4, dated Jan. 14, 2021, 9 Pages.

* cited by examiner

MAGNETICALLY ACTUATED BRAKE

This application claims priority to PCT Application No. PCT/CA2018/050651, filed on May 31, 2018, which claims the benefit of U.S. Provisional Application No. 62/514,003, filed Jun. 1, 2017 and 62/599,685 filed on Dec. 15, 2017, which are is incorporated herein by reference in their entirety.

TECHNICAL FIELD

Brakes.

BACKGROUND

A low profile, lightweight brake can be of benefit in a variety of application including robotic and/or motion control applications in order to arrest or decrease movement in a mechanical system.

SUMMARY

When paired with a high torque motor, such as the electric motor shown in U.S. Pat. No. 9,755,463, the use of a lightweight, low profile brake assembly allows minimal increase in the overall system weight while providing the capability to decrease, arrest, or statically hold a load for practical operational and/or safety considerations.

In an embodiment, there is disclosed a magnetically actuated brake for braking a second element movable with respect to a first element, the magnetically actuated brake comprising a friction sheet fixed to the first element, the friction sheet comprising a magnetically susceptible material, the second element defining a braking surface, the braking surface being substantially parallel to a direction of motion of the second element relative to the first element when the second element is moving relative to the first element, and the first element defining a holding surface disposed facing the braking surface and electromagnets arranged to move the friction sheet between a braking position where the friction sheet engages the braking surface and a non-braking position where the friction sheet engages the holding surface.

Additional features that may be present in some embodiments include: the electromagnets are arranged in a holding portion of the first element that defines the holding surface; the second element comprises permanent magnets, the permanent magnets having sufficient strength to move the friction sheet to the braking position when the electromagnets are not energized; the second element and the first element are components of an electric motor, and the first element has a drive portion comprising further electromagnets arranged to drive the motor by interaction with the permanent magnets, the second element being arranged between the drive portion of the first element and the holding portion of the first element; the friction sheet is arranged so that a portion of the friction sheet remains closer to the holding surface than to the braking surface when the friction sheet is in the braking position; a shim attached to the first element for supporting the portion of the friction sheet closer to the holding surface than to the braking surface; the first element comprises a stator, and the second element comprises a rotor rotatable with respect to the stator; the friction sheet is fixed at a first circumferential part of the friction sheet, and extends circumferentially from the first circumferential part; the friction sheet extends circumferentially from the first circumferential part in both circumferential directions; the friction sheet declines in thickness as it extends from the first circumferential part; the stator is arranged radially inward of the rotor and the friction sheet is fixed to a portion of the first element radially outward of the rotor; the stator is arranged radially outward of the rotor and the friction sheet is fixed to a portion of the first element radially inward of the rotor; the friction sheet defines circumferential slots; an additional stator is arranged to drive the rotor; the friction sheet moves between the braking position and the non-braking position with a wavefront propagation; the wavefront propagation starts from where the friction sheet is fixed to the first element when the friction sheet moves from the braking position to the non-braking position; the first element, second element and friction sheet each respectively are in the form of a disk, which may be in combination with an axial flux motor; slots in the friction sheet, which may extend radially or circumferentially, and which may be oriented perpendicularly to poles of the electromagnets.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
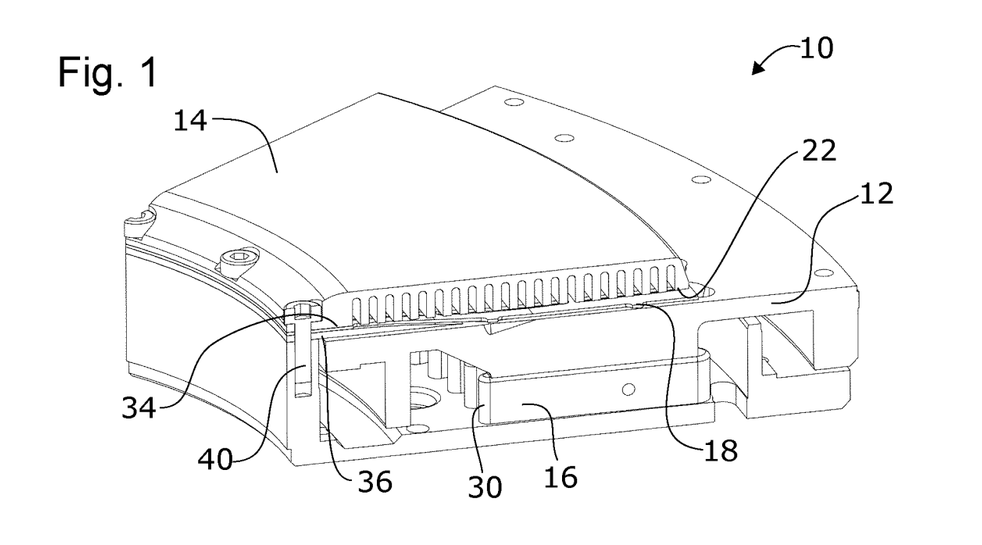
FIG. 1 is a first perspective view of a segment (section) of an exemplary axial embodiment of a magnetically actuated brake viewed from the inside.
Figure 2:
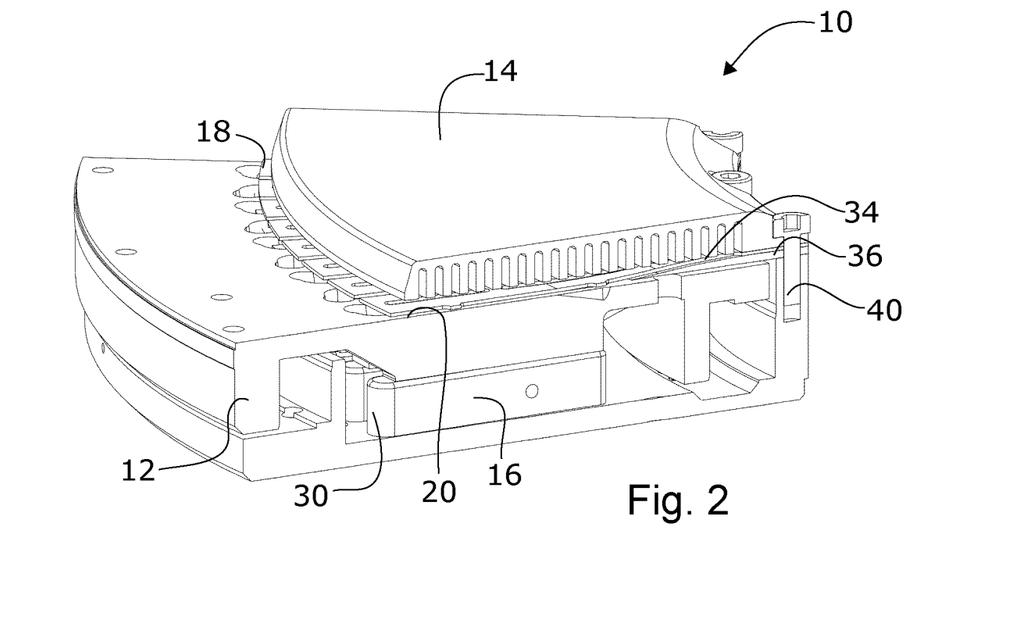
FIG. 2 is a second perspective view of a segment (section) of an exemplary axial embodiment of a magnetically actuated brake viewed from the outside.
Figure 5:
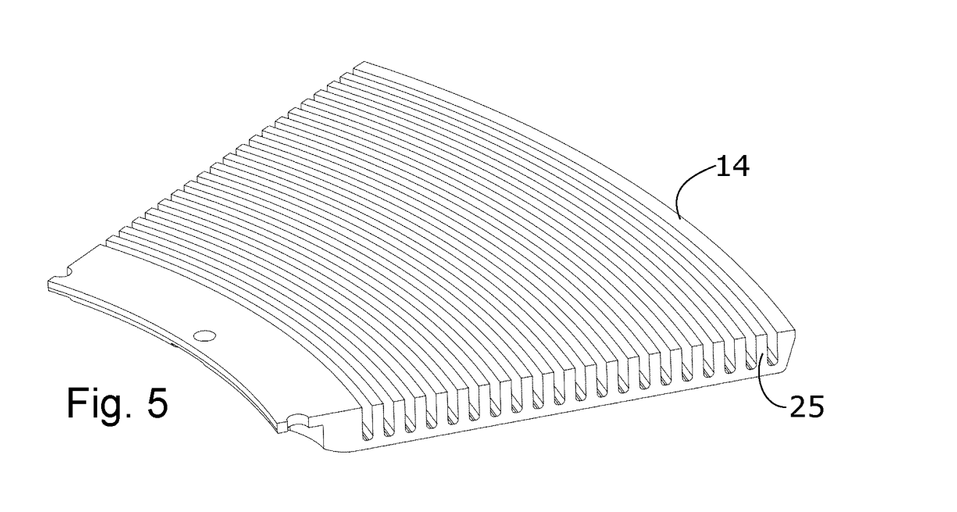
FIG. 5 is a perspective view of a segment (section) of an exemplary secondary stator for an axial magnetically actuated brake.
Figure 6:
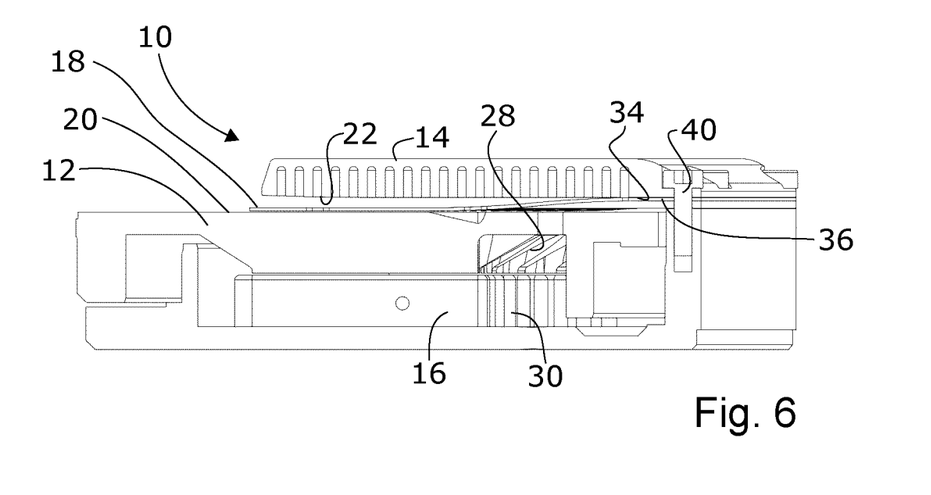
FIG. 6 is a side cutaway view of an axial magnetically actuated brake in engaged position.

A magnetically actuated brake, for example brakes 10 (FIG. 1-8) or 50 (FIGS. 9-14), is provided for braking a second element movable with respect to a first element. In an axial embodiment of a brake 10 shown in FIG. 1, the second element comprises a rotor 12 and the first element comprises a secondary stator 14. The rotor 12 is arranged for rotation relative to a primary stator 16 and is located between the primary stator 16 and secondary stator 14. The primary stator 16 includes electromagnetic elements 30, for example coils on posts, in a drive portion of the primary stator 16 that interact with electromagnetic elements (for example permanent magnets 28) on the rotor 12 to drive the rotor 12 relative to the primary stator 16 in conventional fashion. A friction sheet 18, shown in more detail in FIG. 2, is fixed to the secondary stator 14 and comprises a magnetically susceptible material. The rotor 12 defines a braking surface 20. The braking surface 20 is substantially parallel to a direction of motion of the rotor 12 relative to the secondary stator 14 when the rotor 12 is moving relative to the secondary stator 14. The stator 14 defines a holding surface 22 disposed facing the braking surface 20. Electromagnets, formed of a coil or coils 42 (not shown in FIG. 5 but seen in more detail in FIG. 8) wrapped around magnetic coil posts 25, are arranged in a holding portion 26 of the secondary stator 14 to move the friction sheet 18 between a braking position where the friction sheet 18 engages the braking surface 20 as shown in FIG. 6 and a non-braking position where the friction sheet 18 engages the holding surface 22 as shown in FIG. 7.

Figure 7:
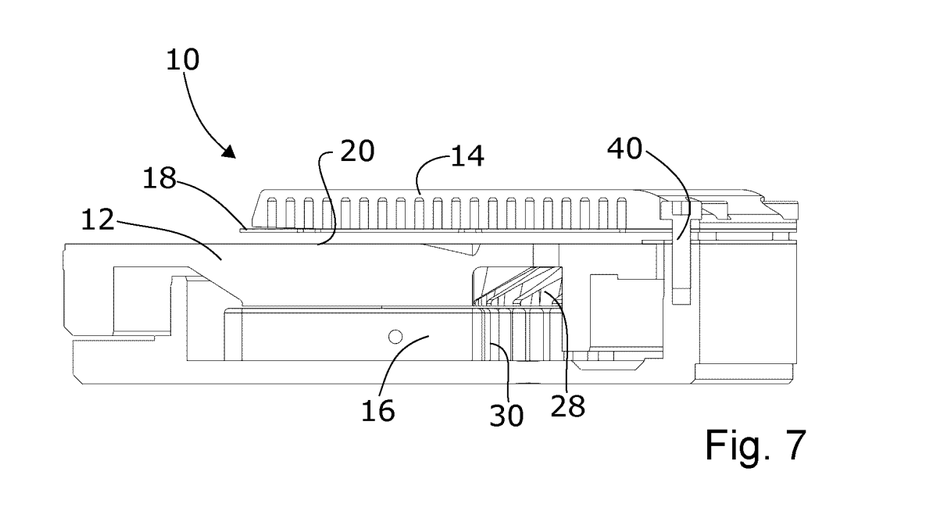
FIG. 7 is a side cutaway view of the brake of FIG. 1 in a disengaged position.

The rotor 12 may comprise permanent magnets 28 shown in FIG. 7 secured in slots in the rotor in any of various conventional ways. The permanent magnets 28 are selected to have sufficient strength to move the friction sheet 18 to the braking position when the electromagnets are not energized.

Figure 3:
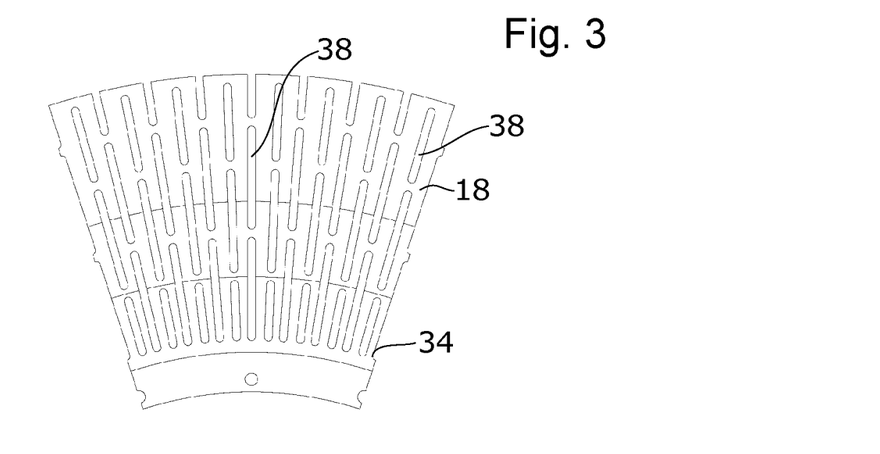
FIG. 3 is a top view of a segment (section) of an exemplary friction disk for the brake of FIG. 1.
Figure 4:
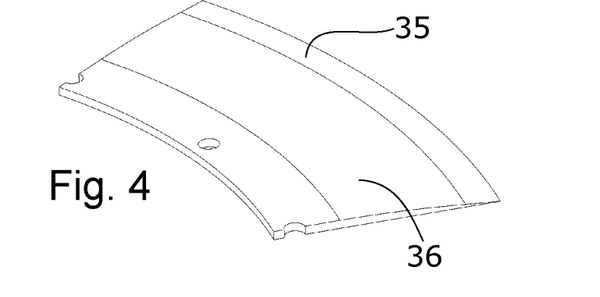
FIG. 4 is a perspective view of a segment (section) of an exemplary peel shim for an axial magnetically actuated brake.

The friction sheet 18 may be arranged so that a portion, for example an inner portion 34, of the friction sheet 18 remains closer to the holding surface 22 than to the braking surface 20 when the friction sheet 18 is in the braking position. A manner of achieving this location of the friction sheet 18 is to provide a shim 36 attached to the rotor 12 for supporting the portion 34 of the friction sheet 18 closer to the holding surface 22 than to the braking surface 20. As shown in FIG. 3, the friction sheet 18 may include radially extending slots or cutouts 38 in order to tailor the stiffness of the material to achieve a desired brake actuation.

Figure 8:
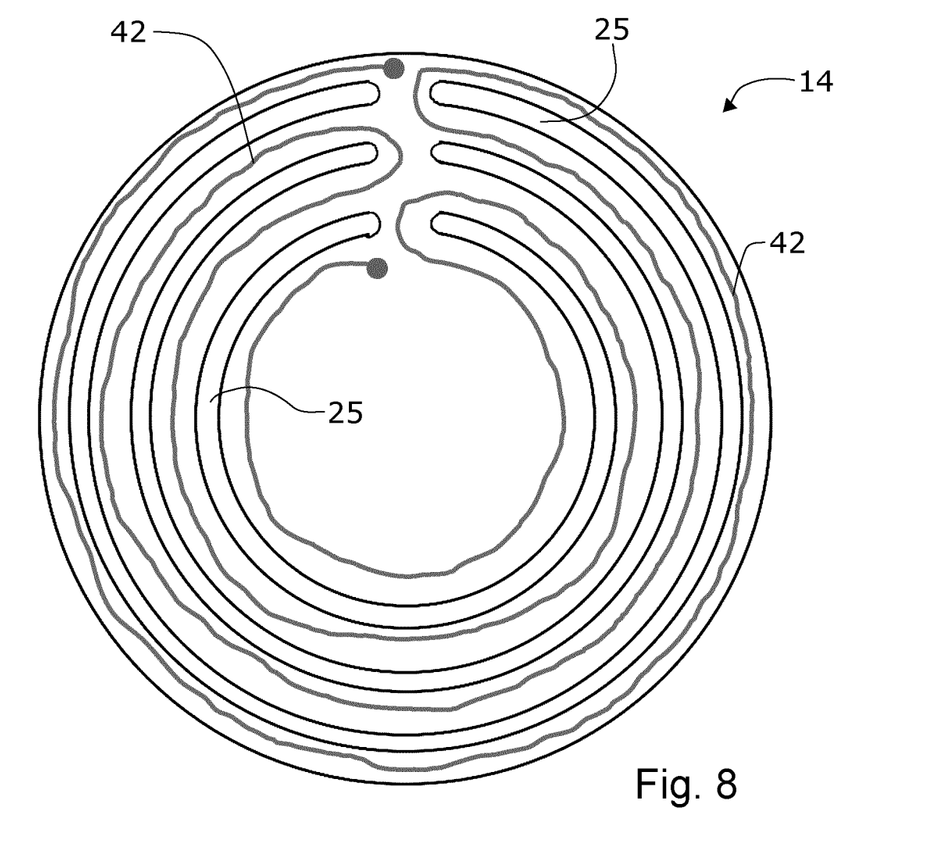
FIG. 8 is a schematic diagram showing an exemplary winding pattern for a secondary stator for an axial magnetically actuated brake.

In the axial flux embodiment of an electromagnetic brake shown in FIGS. 1-8, the secondary stator 14, a disk, may be directly affixed to the primary stator 16, also a disk, by bolts 40 with axial flux rotor 12, also a disk, sandwiched between. The friction sheet 18 also has the form of a disk. As shown in FIG. 8, the secondary stator 14 houses coil windings 42 that are used to create a magnetic force during operation. The coils 42 are wound radially across the surface of the secondary stator 14 in alternating directions so each circular post 25 is the opposite polarity to the posts 25 to the ID and OD of it. The windings 42 in the slots will be in the same direction in every first slot and the opposite direction in every second slot so every second circular (or semi-circular) post 25 is of the same polarity but opposite polarity to the circular (or semi-circular) slots on the immediate inside and outside of it. This can be accomplished in a number of ways, such as with a radial slot along the top face of the stator below that is used to route the wire in the opposite direction from circumferential slot to circumferential slot to slot (radial slot not shown in FIG. 3 but seen in FIG. 8). A radial groove allows the wires to be inserted in such a way as to generate alternating polarity flux in each next concentric circular post.

Between the secondary stator 14 and the rotor 12 there may be a peel shim 36 as well as the friction sheet 18, also a disk in this embodiment. In an embodiment, the peel shim 36 is included on the inner diameter of the primary stator 16 with an appropriate gap to the rotor 12 to ensure there is no contact. The peel shim 36 effectively reduces the required applied force necessary to separate the friction disk 18 from the rotor 12 and, hence, the amount of current or power required to be applied to the brake in order to create disengagement. The size, shape, and angle 35 of the peel shim 36 dictate the degree to which it reduces the required applied force for disengagement of the friction disk 18. The peel shim creates a peeling action from the inner diameter to the outer diameter of the friction disk 18 as a result of the surface of the friction disk 18 being held closer to the secondary stator surface during engagement such that at the moment of disengagement, when power is applied to the secondary stator 14, the net force on the local section of the friction disk 18 next to but not contacting the secondary stator, is higher. The higher net force results in the friction disk 18 in the region of the peel shim 36 disengaging sooner than the friction disk 18 furthest away from the peel shim 36. This motion takes advantage of the higher magnetic force closest to the secondary stator 14 to disengage it from the surface of the rotor 12.

In an embodiment, the friction disk 18 is comprised of a high friction coefficient material such as aluminum bronze in order to achieve high brake force for a given magnetic force The actuation of the brake 10 with respect to engagement is such that when no power is provided to the coil windings 42 in the secondary stator 14, the brake is engaged due to the attraction force created by the permanent magnets 28 contained within the rotor 12. The force of the permanent magnets 28 results in the friction disk 18 being pulled on to the rotor surface 20 such that the contact force between the friction disk 18 and the rotor surface 20 produces sufficient friction to prevent or eliminate movement of the rotor 12.

In some embodiments, various coatings and surface finishes may be used on the friction disk 18 and rotor contact surfaces 20 to maximize durability and wear, enhance the overall frictional nature of the interface, and/or to dissipate heat.

The actuation of the brake with respect to disengagement is such that when power is applied to the magnetic coil windings 42, a magnetic pulling force is developed between the secondary stator 14 and the friction disk 18. The net force on the friction disk 18, accounting for the magnetic force pulling towards the rotor 12 and the newly created force pulling toward the secondary stator 14, results in the friction disk 18 being pulled toward the surface of the secondary stator 14.

The amount of magnetic pulling force developed by the secondary stator 14 is determined by the number of windings (number of magnetic coil winding posts 25) and the total amount of current applied to the magnetic coils. In an embodiment, the holding current required to keep the friction disk disengaged on a 200 mm outer diameter (OD) disk, is less than 10 amperes. As the flexible disk 18 engages with the rotor 12, the engagement of the disk 18 with the rotor 12 propagates with a wavefront motion.

The radial slots 38 in the flexible disk 18 serve two purposes. One is to allow the disk 18 to expand circumferentially during wave propagation the friction disk 18 to rotor 12 engagement. The second is to act as flux restrictors between aligned magnet poles. This may be necessary in some embodiments to reduce the force that is necessary from the secondary stator 14 electromagnet to disengage the brake. The posts 25 on the secondary stator 14 are circumferential which makes them perpendicular to the flexible disk slots 25, while the slots 25 are parallel to the poles on the primary stator 16. The flexible disk slots 25 do not, therefore, restrict the flux from the electromagnetic stator, which reduces the power to hold the flexible disk against the secondary stator, and to draw the flexible disk 18 into contact with the secondary stator 14.

In a radial flux embodiment of an electric motor, a magnetic brake for the motor uses the magnetic force on the outer surface of a flux concentrating rotor to pull a flexible brake spring, forming a friction sheet, into friction contact with the rotor. If the rotor is on the OD of the stator, the flexible brake spring contacts the OD of the rotor. An electromagnetic stator surrounds the rotor and brake spring and pulls the flexible brake spring away from the rotor when it is energized. The brake spring may have a variable thickness around the circumference and is thicker near where it is fixed to the housing. The brake spring may be split so it can clamp down on the rotor symmetrically. The OD of the brake spring may be closer to the surrounding stator near the fixed section of the brake spring so the air gap to the brake stator is smaller and the gap to the rotor and the inner diameter (ID) of the brake spring is larger to allow the brake stator to pull on this area with greater force initially when it is energized to disengage the brake.

Figure 9:
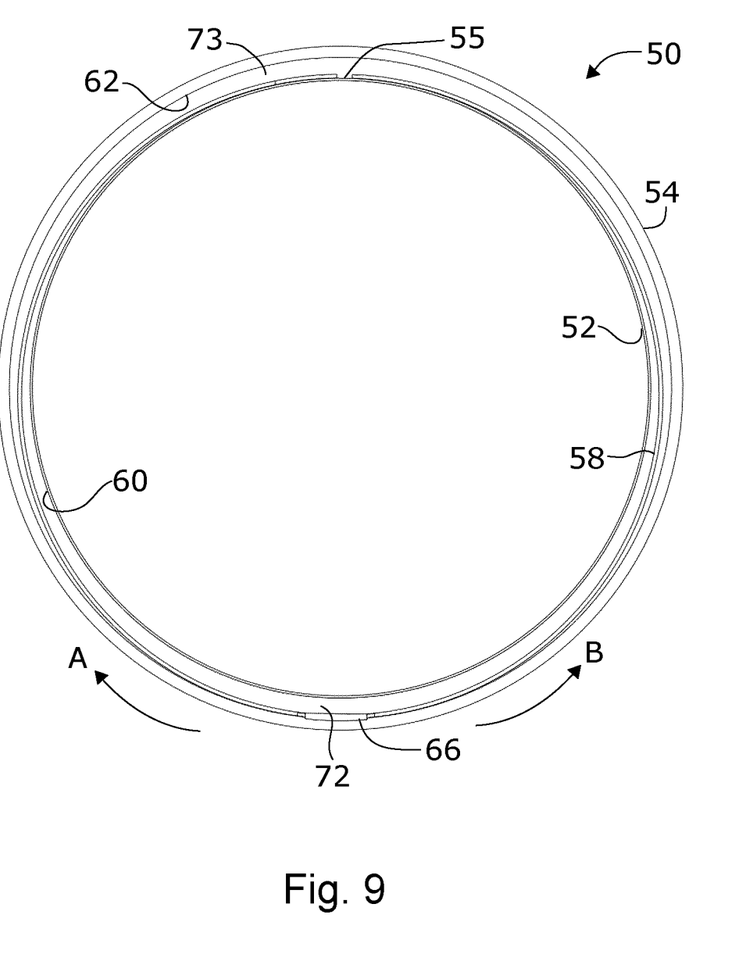
FIG. 9 is an end view of a rotor, friction sheet and secondary stator for a radial magnetically actuated brake showing the brake partially engaged.
Figure 10:
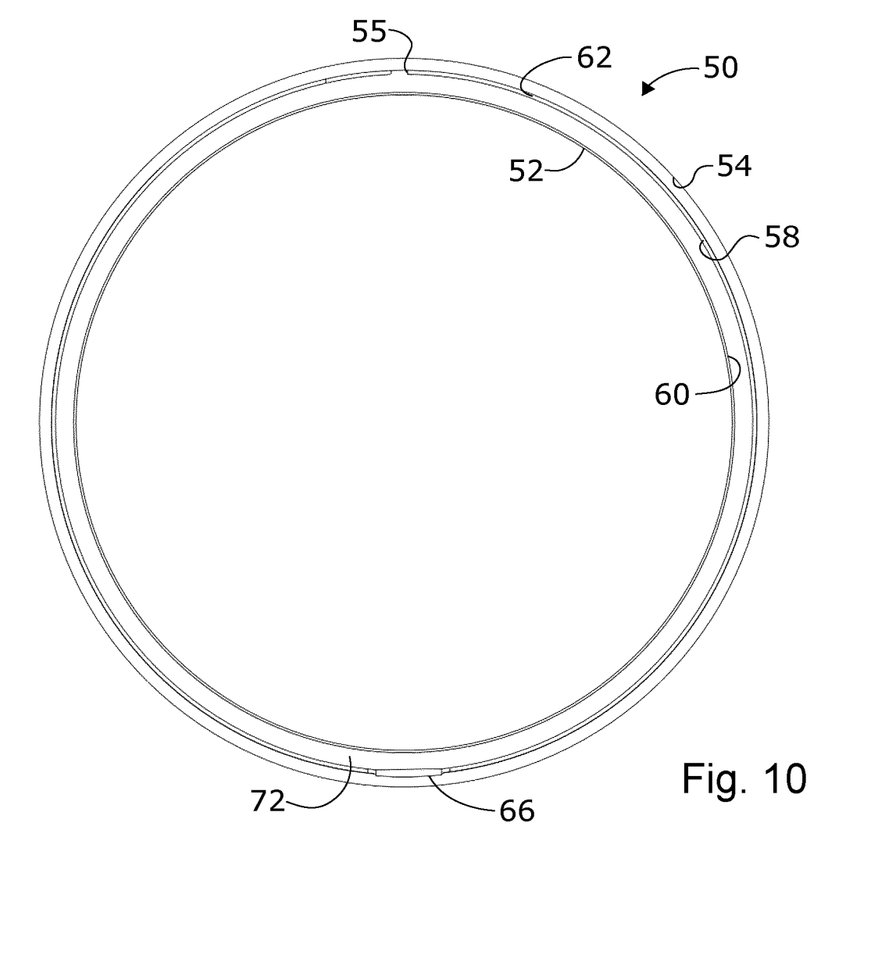
FIG. 10 is an end view of a rotor, friction sheet and secondary stator for a radial magnetically actuated brake showing the brake partially engaged.
Figure 11:
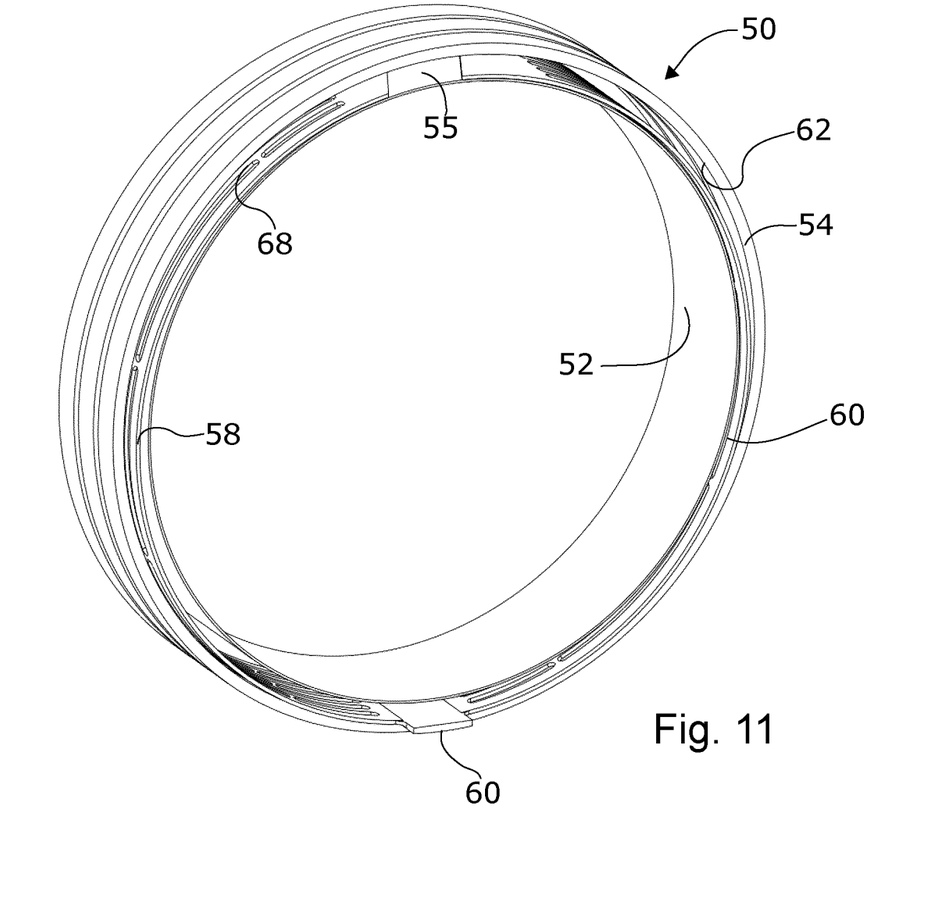
FIG. 11 is an isometric view of the components shown in FIGS. 9 and 10.
Figure 12:
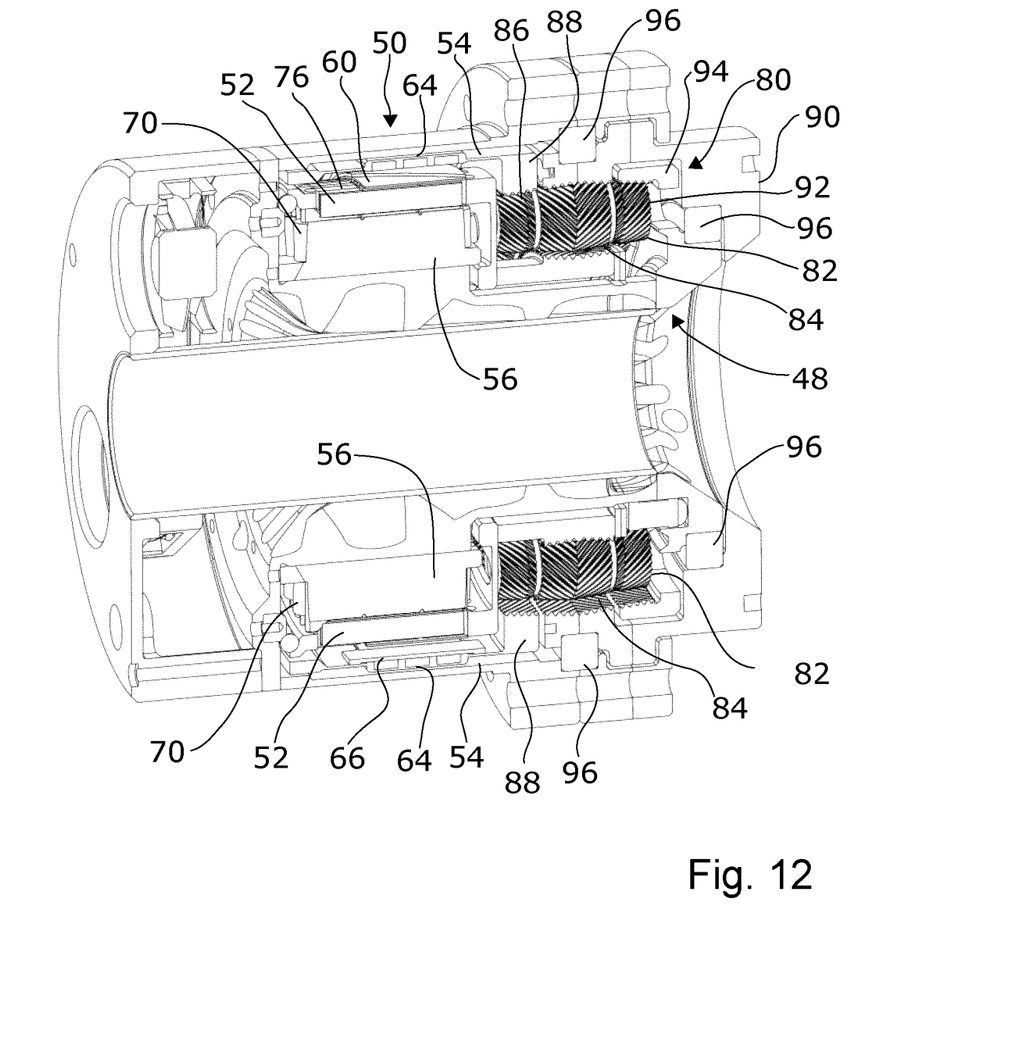
FIG. 12 is a cutaway view of an actuator assembly including a radial magnetically actuated brake.
Figure 13:
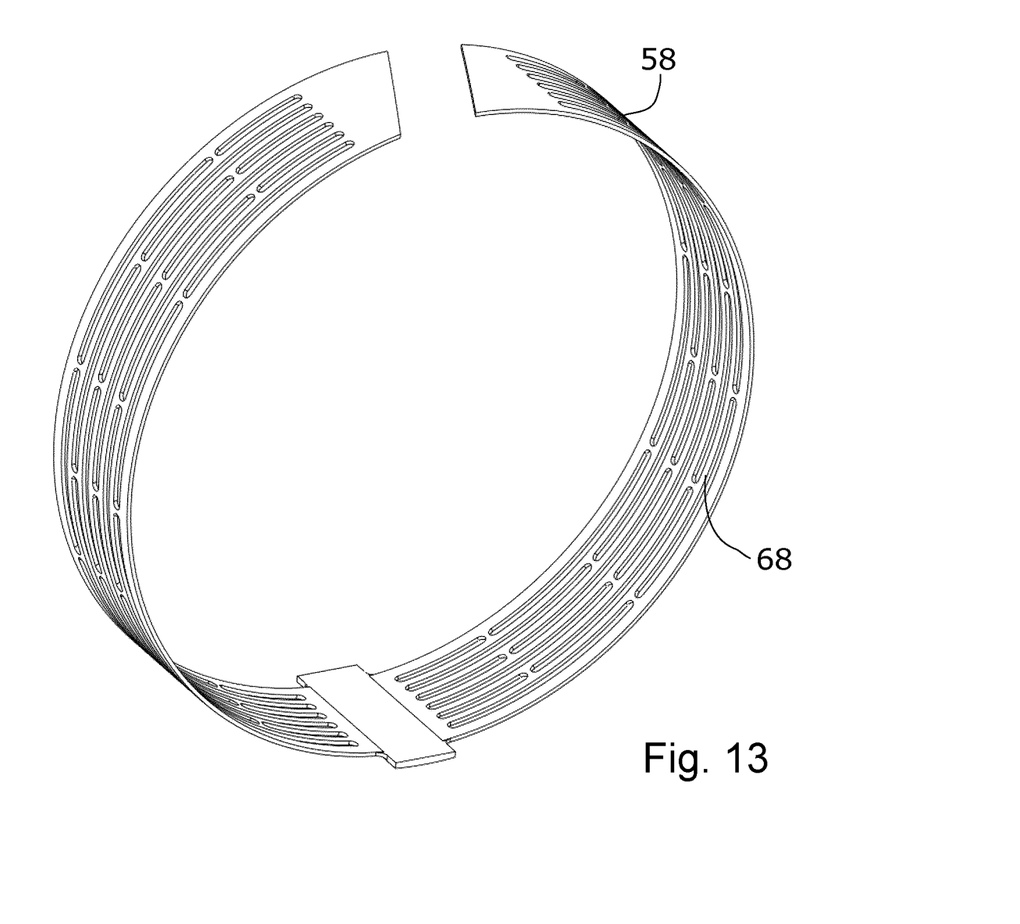
FIG. 13 is an isometric view of a friction sheet for a radial brake.
Figure 14:
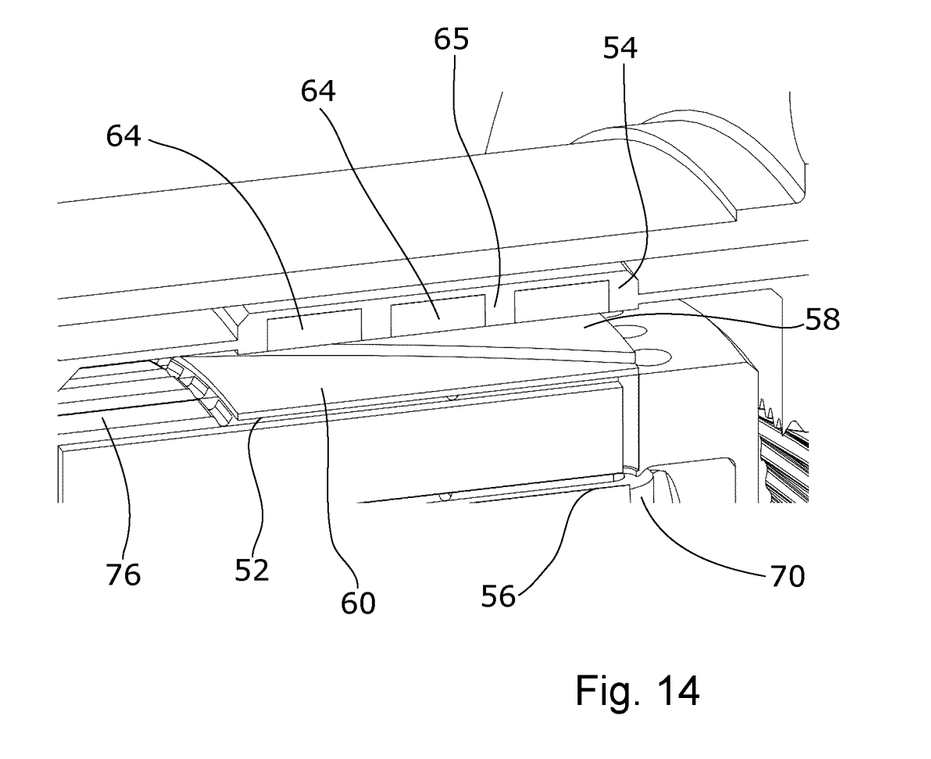
FIG. 14 is a closeup of the cutaway view of the actuator of FIG. 12 showing the brake.

FIGS. 9-11 illustrate an embodiment of an electromagnetic brake 50 in which a rotor is arranged radially inward of a braking surface, and FIG. 12 illustrates an embodiment of such a brake in a radial flux electric machine 48. The magnetically actuated brake 50 is provided for braking a rotor 52 (second element) movable with respect to a stator 54 (first element) and an additional stator 56 that is not shown in FIGS. 9-11 but shown in FIG. 12. The additional stator 56 is arranged to drive the rotor 52 in conventional fashion. A friction sheet 58 is fixed to the stator 54. In FIGS. 9-11 only a friction surface of friction cylinder forming the outer surface of the rotor 52 is shown, and only the coils of the stator 54 are shown.

The friction sheet 58 comprises a magnetically susceptible material and may comprise a brake spring that is split at one end 55. The rotor 52 defines a braking surface 60, which may be a separate braking cylinder that is secured to or formed as an integral part of the rotor 52. The braking surface 60 extends substantially parallel to a direction of motion of the rotor 52 relative to the stator 54 when the rotor 52 is moving relative to the stator 54, and the stator 54 has or defines a holding surface 62 disposed facing the braking surface 60. Electromagnets 64 in the stator 54 are arranged to move the friction sheet 58 between a braking position where the friction sheet engages the braking surface and a non-braking position where the friction sheet engages the holding surface 62. Coils for the electromagnets 64 in the stator 54 are wound around the inside diameter of the stator 54. Each of three exemplary coils shown in FIGS. 12 and 14 (though any number of coils may be used) are alternating in direction so circumferential stator posts 65 are alternating in the radial direction N S N S.

The friction sheet 58 may be fixed at a first circumferential 66 part of the friction sheet 58 for example to the stator 54, and extend circumferentially from the first circumferential part 66 for example in one or both circumferential directions A and B shown in FIG. 9. The friction sheet 58 may thin, that is, decline in thickness, as it extends from the first circumferential part 66.

As shown in FIG. 12, the stator 56 may be arranged radially inward of the rotor 52 and the friction sheet 58 is fixed to a portion of the stator 54 radially outward of the rotor 52 as shown in FIGS. 9-11 so that a gap 72 is formed between the friction sheet 58 and rotor 52 at position 66. Alternatively, the stator may be arranged radially outward of the rotor and the friction sheet is fixed to a portion of the first element radially inward of the rotor. The friction sheet 58 may define circumferential slots 68. The friction sheet 58 moves between a braking position shown in FIGS. 9 and 11 where the friction sheet 58 engages the rotor 52 and a non-braking position shown in FIG. 10 in which the friction sheet 58 is pulled away from the rotor 52 against the stator 54. The friction sheet 58 may move between the braking position and the non-braking position with a wavefront propagation. The wavefront propagation may start from where the friction sheet 58 is fixed to the first element when the friction sheet 58 moves from the braking position to the non-braking position.

Embodiments of the device include a magnetically actuated brake 50 made to work with a radially configured actuator 48 shown in FIG. 12. The non-limiting embodiment of the device presented in this document comprises a brake stator 54 and brake stator coils 70, a friction sheet 58 or brake spring, and may include a friction cylinder (not shown) which interfaces with the motor's rotor 52. The rotor 52 may be coupled to a symmetric differential gear system 80 to drive an output.

The differential gear system shown in FIG. 12, for the actuator 48 with stator 56 and rotor 52, includes a differential gear 82 that has at least a central gear 84 and a first outer gear 86. The central gear 84 is in geared contact with the rotor 52 to be driven by the rotor 52. The first outer gear 86 is in geared contact with a race 88 that is fixed in relation to the stator 54 and stator 56 to form a reference gear. The central gear 84 is in geared connection with an output 90. The differential gear 82 may have a second outer gear 92 and the second outer gear 92 may be in geared contact with a floating race 94. Each geared surface and race may have angled teeth and corresponding grooves and the central gear 84 may have a herringbone pattern of gear teeth. Bearings 96 may be used to support the output 90 in relation to the housing 98 and stator 56.

A friction cylinder may be secured to the inner or outer diameter of a motor rotor 52 for example by press fit or friction fit or may be part of or form the surface of the rotor 52. The friction sheet or brake spring 58 must be fixed at a point about its circumference, for example at the base 66, to a fixed component of the motor. In the non-limiting embodiment shown in FIG. 12, the base of the brake spring 58 is secured to the actuator's fixed ring 54 at 66. In FIG. 9, in the braking position, there is a base gap 72 between the brake spring 58 and the rotor 52 at 66 and an upper gap 73 between the brake spring 58 and stator 54. The brake spring 58 is close to the brake stator 54 near the attachment point, which allows a peeling wave to propagate around the brake spring 58 when releasing the brake from the rotor 52.

In an unpowered state, the brake spring 58 is attracted to the magnets 76 in the motor's rotor 52 and in turn makes contact with the friction ring or braking surface of the rotor 52 to prevent the rotor 52 from rotating. When current is applied to the brake coils 70, the brake spring 58 is attracted to the brake coils 70 and disengaged from the friction cylinder or rotor braking surface, causing the rotor 52 to spin freely.

In the non-limiting embodiment shown in FIGS. 9-13, the brake spring has circumferentially extending slots or cut outs 68 to add resistance to the flux path from the rotor's magnets 76. These cutouts 68 make it easier for the brake stator 54 to peel the spring 58 off the rotor 52.

An embodiment with an outer rotor is shown. In another embodiment, the rotor may be an inner rotor and the friction cylinder may be on the inner diameter of the rotor, and the brake spring and stator coils fixed to a portion of the motor inward of the inner diameter of the rotor.

In a linear embodiment, the friction element may comprise a flat sheet that is normally attracted to a moving element or rotor that is movable with respect to a stator, and the stator may comprise electromagnets that may be actuated to lift the flat sheet off the moving element during normal operation.

The friction sheet 18 may be a flexible disk that moves from a released position to the braking position with a wavefront propagation. Various coatings may be applied to the rotors or friction sheets to increase friction, reduce wear, and/or dissipate heat. The slots of the friction sheet may allow circumferential expansion of the friction sheet to allow the outer diameter of the disk to change during actuation.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A magnetically actuated brake for braking a second element movable with respect to a first element, the magnetically actuated brake comprising:
   a friction sheet fixed to the first element, the friction sheet comprising a magnetically susceptible material;
   the second element defining a braking surface, the braking surface being parallel to a direction of motion of the second element relative to the first element when the second element is moving relative to the first element, and the first element defining a holding surface disposed facing the braking surface;
   electromagnets arranged to move the friction sheet between a braking position where the friction sheet engages the braking surface and a non-braking position where the friction sheet engages the holding surface;
   in which the electromagnets are arranged in a holding portion of the first element that defines the holding surface; and
   in which the second element comprises permanent magnets, the permanent magnets having sufficient strength to move the friction sheet to the braking position when the electromagnets are not energized.

2. The magnetically actuated brake of claim 1 in which the second element and the first element are components of an electric motor, and the first element has a drive portion comprising further electromagnets arranged to drive the motor by interaction with the permanent magnets, the second element being arranged between the drive portion of the first element and the holding portion of the first element.

3. The magnetically actuated brake of claim 1 in which the friction sheet is arranged so that a portion of the friction sheet remains closer to the holding surface than to the braking surface when the friction sheet is in the braking position.

4. The magnetically actuated brake of claim 3 further comprising a shim attached to the first element for supporting the portion of the friction sheet closer to the holding surface than to the braking surface.

5. The magnetically actuated brake of claim 1 in which the first element comprises a stator, and the second element comprises a rotor rotatable with respect to the stator.

6. The magnetically actuated brake of claim 5 in which the friction sheet is fixed at a first circumferential part of the friction sheet, and extends circumferentially from the first circumferential part.

7. The magnetically actuated brake of claim 6 in which the friction sheet extends circumferentially from the first circumferential part in both circumferential directions.

8. The magnetically actuated brake of claim 6 or claim 7 in which the friction sheet declines in thickness as it extends from the first circumferential part.

9. The magnetically actuated brake of claim 1 in which the stator is arranged radially inward of the rotor and the friction sheet is fixed to a portion of the first element radially outward of the rotor.

10. The magnetically actuated brake of claim 1 in which the stator is arranged radially outward of the rotor and the friction sheet is fixed to a portion of the first element radially inward of the rotor.

11. The magnetically actuated brake of claim 1 in which the friction sheet defines circumferential slots.

12. The magnetically actuated brake of claim 1 further comprising an additional stator arranged to drive the rotor.

13. The magnetically actuated brake of claim 1 in which the friction sheet moves between the braking position and the non-braking position in such a way that a first portion of the friction sheet moves while a second portion of the friction sheet does not.

14. The magnetically actuated brake of claim 13 in which when the friction sheet moves from the braking position to the non-braking position, the first portion is arranged closer to the location at which the friction sheet is fixed to the first element than the second portion of the friction sheet is.

15. The magnetically actuated brake of claim 1 in which the first element, second element and friction sheet each respectively are in the form of a disk.

16. The magnetically actuated brake of claim 15 in combination with an axial flux motor.

17. The magnetically actuated brake of claim 1 further comprising slots in the friction sheet.

18. The magnetically actuated brake of claim 17 in which the slots extend radially.

19. The magnetically actuated brake of claim 18 in which the electromagnets define poles, and the slots extend perpendicularly to the poles of the electromagnets.

20. The magnetically actuated brake of claim 17 in which the slots extend circumferentially.

21. A magnetically actuated brake for braking a second element movable with respect to a first element, the magnetically actuated brake comprising:
    a friction sheet fixed to the first element, the friction sheet comprising a magnetically susceptible material;
    the second element defining a braking surface, the braking surface being parallel to a direction of motion of the second element relative to the first element when the second element is moving relative to the first element, and the first element defining a holding surface disposed facing the braking surface;

electromagnets arranged to move the friction sheet between a braking position where the friction sheet engages the braking surface and a non-braking position where the friction sheet engages the holding surface;

in which the friction sheet is arranged so that a portion of the friction sheet remains closer to the holding surface than to the braking surface when the friction sheet is in the braking position; and further comprising a shim attached to the first element for supporting the portion of the friction sheet closer to the holding surface than to the braking surface.

22. A magnetically actuated brake for braking a second element movable with respect to a first element, the magnetically actuated brake comprising:

a friction sheet fixed to the first element, the friction sheet comprising a magnetically susceptible material;

the second element defining a braking surface, the braking surface being parallel to a direction of motion of the second element relative to the first element when the second element is moving relative to the first element, and the first element defining a holding surface disposed facing the braking surface;

electromagnets arranged to move the friction sheet between a braking position where the friction sheet engages the braking surface and a non-braking position where the friction sheet engages the holding surface;

in which the first element comprises a stator, and the second element comprises a rotor rotatable with respect to the stator;

in which the friction sheet is fixed at a first circumferential part of the friction sheet, and extends circumferentially from the first circumferential part; and in which the friction sheet declines in thickness as it extends from the first circumferential part.

\* \* \* \* \*